Nov. 17, 1942.                    C. D. RYAN                    2,302,060
                CONVEYER MECHANISM FOR MAIL TREATING APPARATUS
         Original Filed April 29, 1940         10 Sheets-Sheet 1

INVENTOR
COMMODORE D. RYAN.
BY Blair, Curtis & Hayward.
ATTORNEYS

Nov. 17, 1942.   C. D. RYAN   2,302,060
CONVEYER MECHANISM FOR MAIL TREATING APPARATUS
Original Filed April 29, 1940   10 Sheets-Sheet 2

INVENTOR
COMMODORE D. RYAN.
BY Blair, Curtis & Hayward
ATTORNEYS

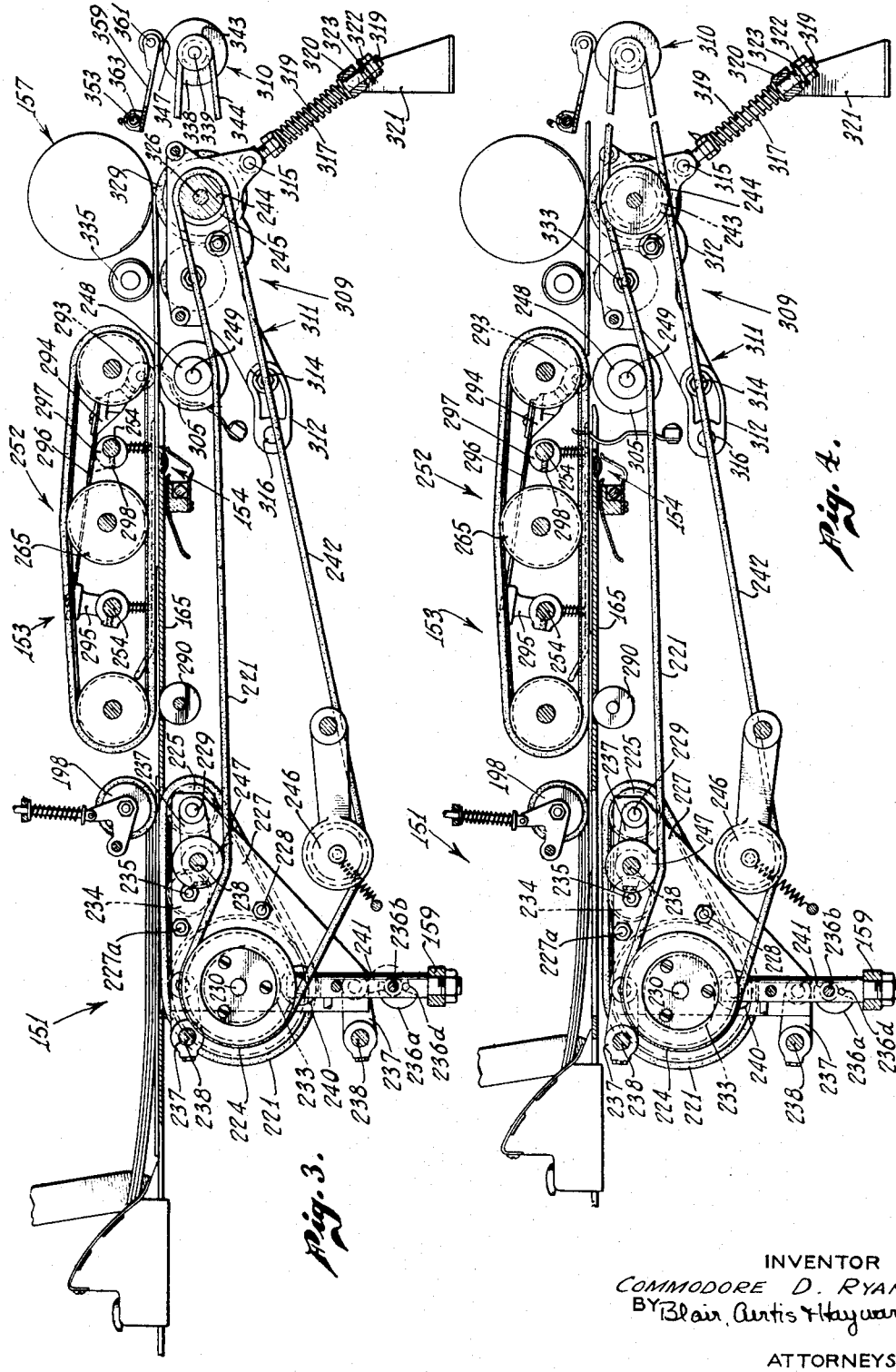

INVENTOR
COMMODORE D. RYAN.
BY Blair, Curtis & Hayward
ATTORNEYS

Nov. 17, 1942.    C. D. RYAN    2,302,060
CONVEYER MECHANISM FOR MAIL TREATING APPARATUS
Original Filed April 29, 1940    10 Sheets-Sheet 6

INVENTOR
COMMODORE D. RYAN.
BY Blair, Curtis & Hayward
ATTORNEYS

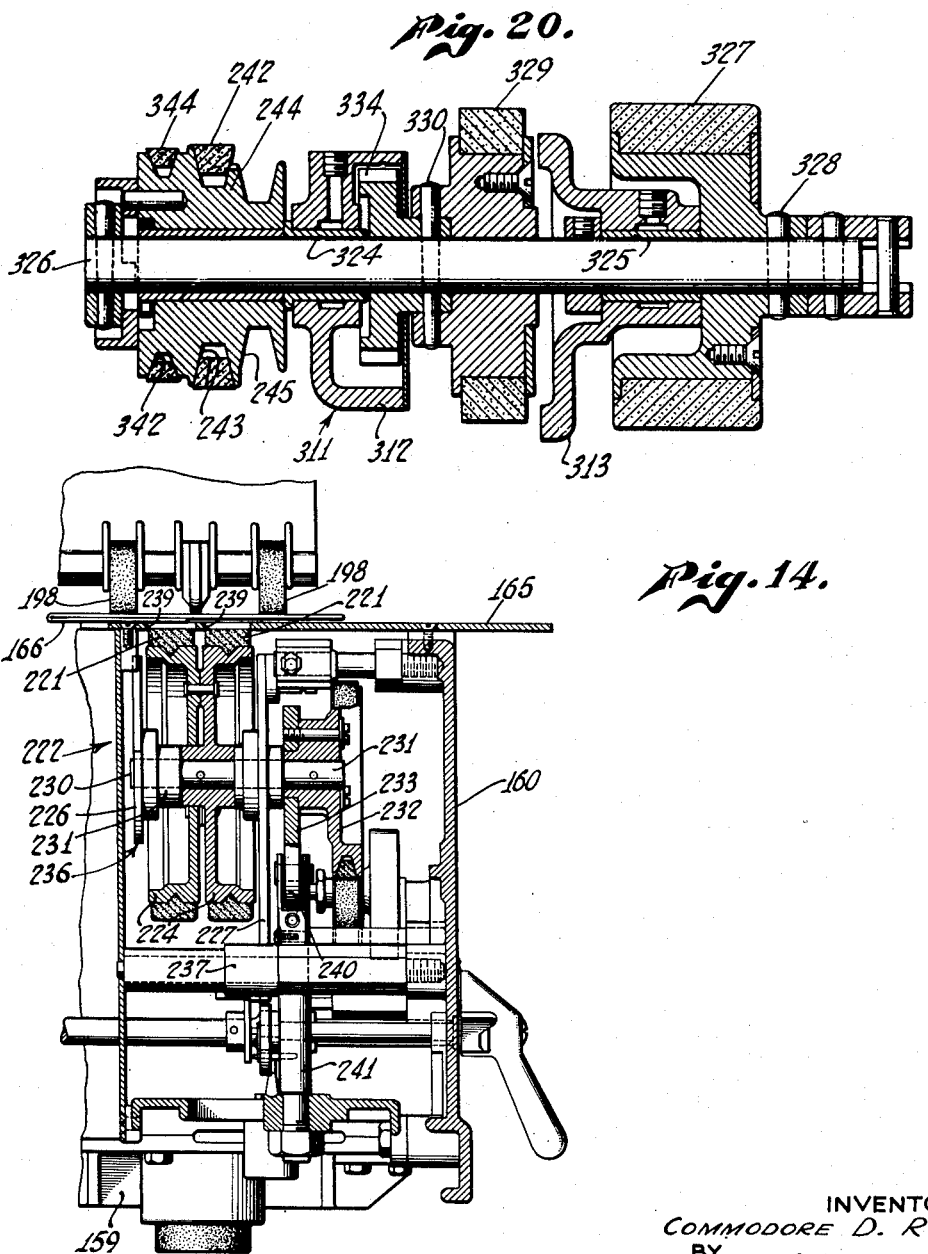

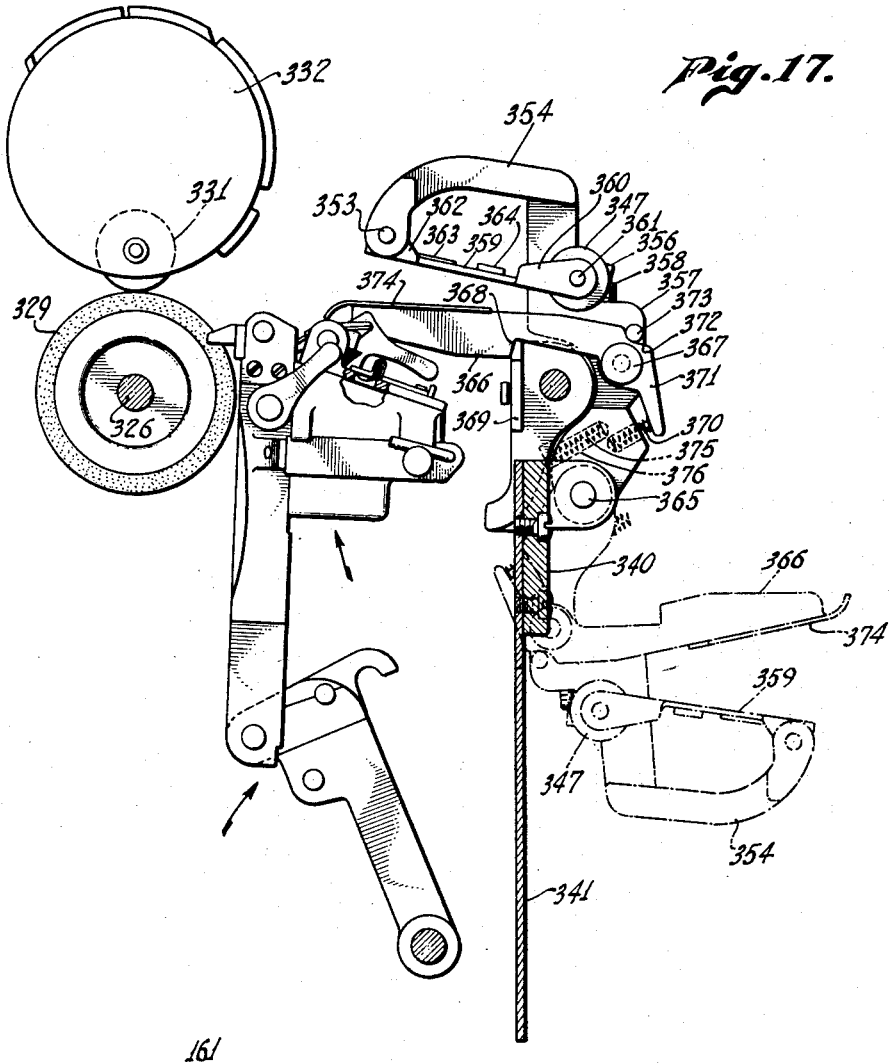

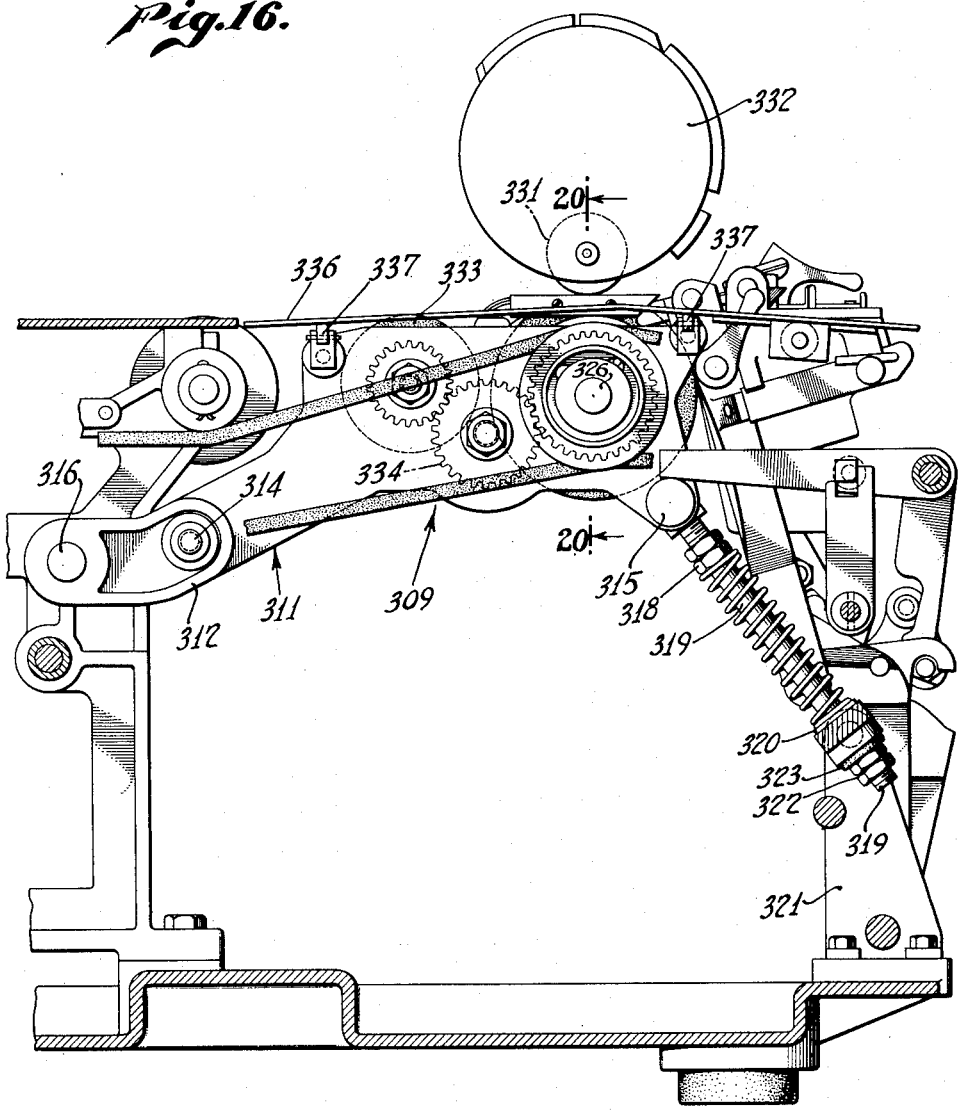

Nov. 17, 1942.　　　　C. D. RYAN　　　　2,302,060
CONVEYER MECHANISM FOR MAIL TREATING APPARATUS
Original Filed April 29, 1940　　　10 Sheets-Sheet 10

INVENTOR
COMMODORE D. RYAN.
BY Blair Curtis & Hayward
ATTORNEYS

Patented Nov. 17, 1942

2,302,060

UNITED STATES PATENT OFFICE 2,302,060

CONVEYER MECHANISM FOR MAIL TREATING APPARATUS

Commodore D. Ryan, Los Angeles, Calif., assignor to National Postal Meter Company, Inc., Rochester, N. Y., a corporation of Delaware Original application April 29, 1940, Serial No. 332,305. Divided and this application December 2, 1941, Serial No. 421,321

15 Claims. (Cl. 271—45)

This invention relates to apparatus for conveying mail matter through a mail treating machine.

One of the objects of this invention is to provide a conveyer system for a mail treating machine which is simple and sturdy in construction and capable of efficient operation at a high rate of speed. Another object is to provide apparatus of the above nature capable of efficiently handling envelopes and cards of various widths, lengths, and thicknesses without mutilation thereof. Another object is to provide apparatus of the above nature which can be safely operated at high speed in conveying mail matter from the receiving end of the machine to the delivery end thereof. Other objects will be in part apparent and in part pointed out hereinafter.

This application is a division of the application of Frank P. Sager et al., Serial No. 332,305, filed April 29, 1940.

The invention accordingly consists in the features of construction, combinations of elements, and arrangements of parts as will be exemplified in the structure to be hereinafter described and the scope of the application of which will be indicated in the following claims.

In the drawings, in which there is shown one embodiment of the invention,

Figure 3 is a fragmental sectional elevation similar to Figure 2, showing the driving means for the envelope feed conveyer set for slow feed operation, preferably used when treating relatively long envelopes;

Figure 4 is a view similar to Figure 3 but showing the driving means for the envelope conveyer set for high speed operation, which is preferably used for treating relatively short envelopes;

Figure 1:
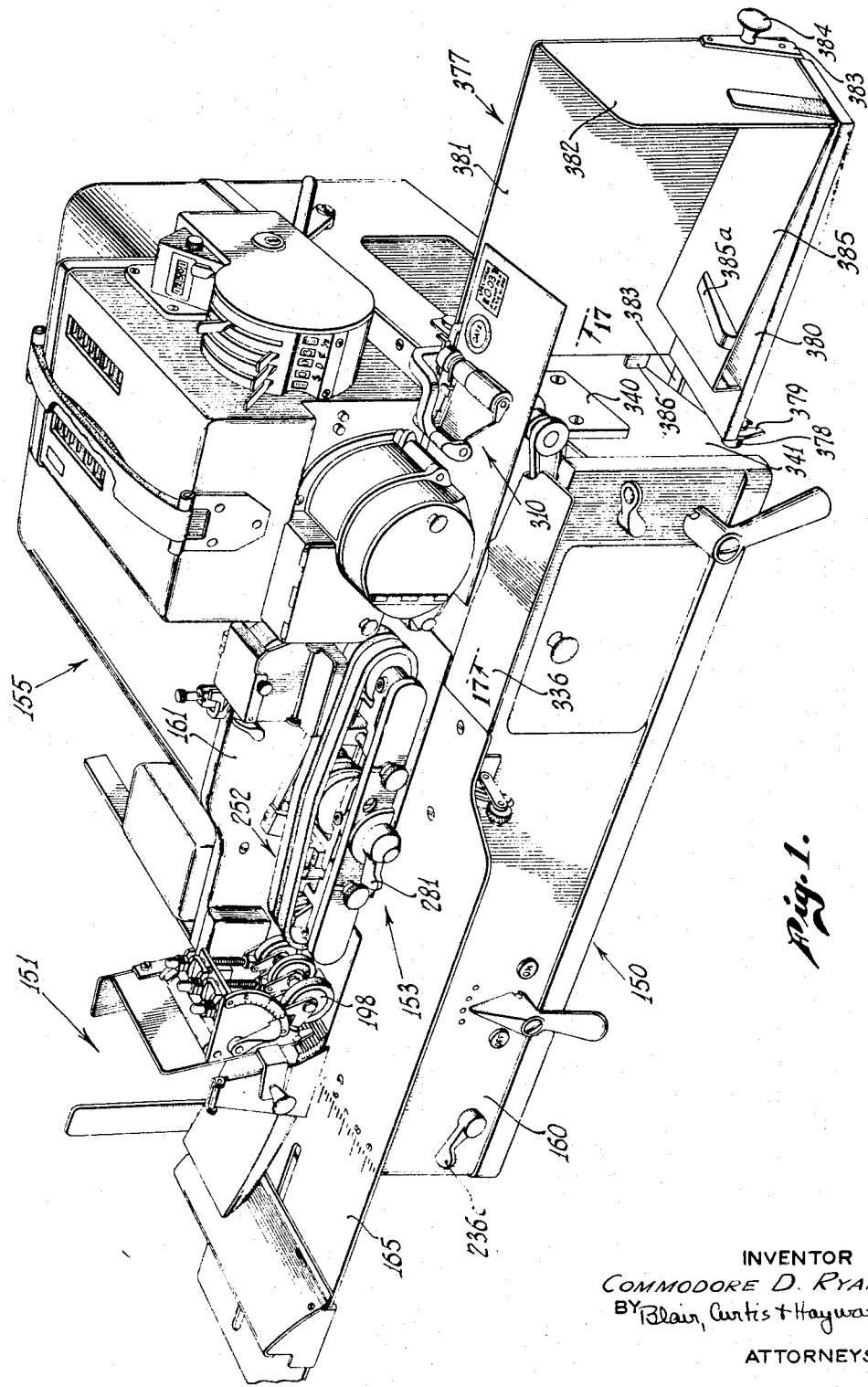
Figure 1 is a perspective view of the mail treating machine.
Figure 2:
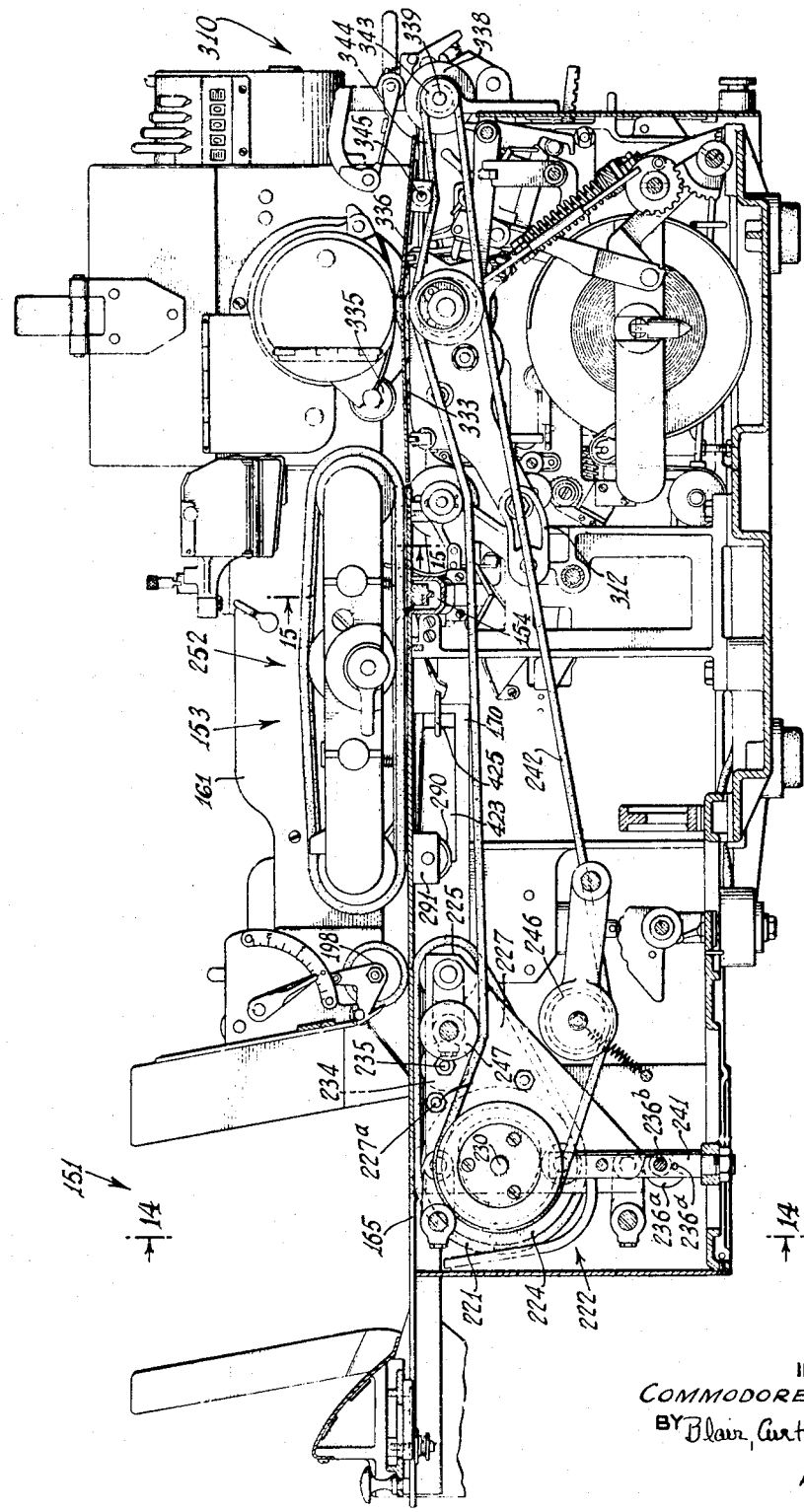
Figure 2 is an enlarged sectional elevation of the machine shown in Figure 1, showing the envelope feeding hopper, the stripper, and the envelope conveying mechanism.
Figure 6:
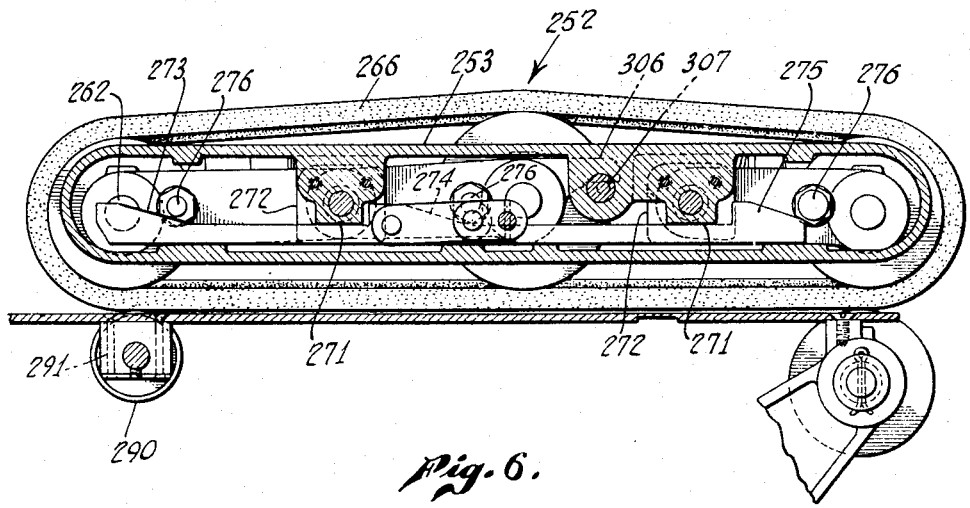
Figure 6 is a sectional view of the hold-down truck similar to Figure 5 but showing the cam bar which is operable to raise or lower the rollers of the truck, this view being taken substantially along the line 6—6 of Figure 10.
Figure 7:
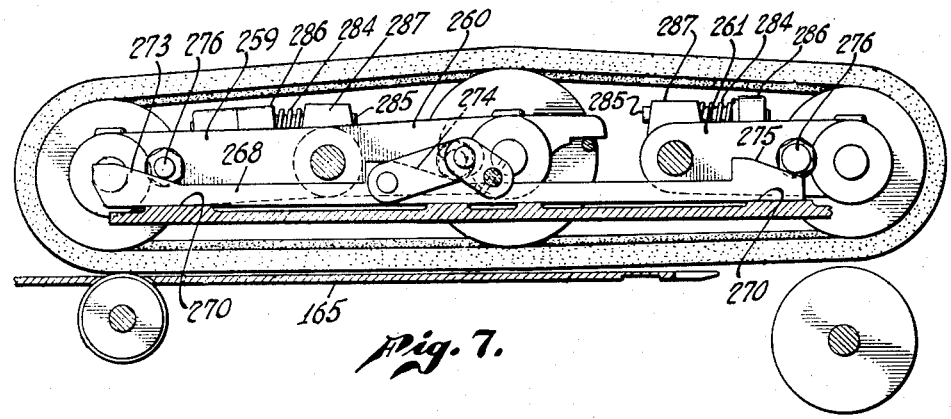
Figure 8:
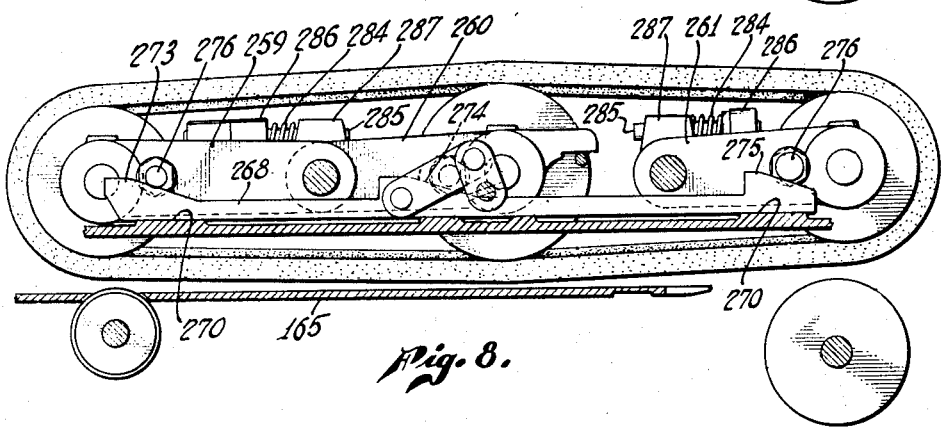
Figure 9:
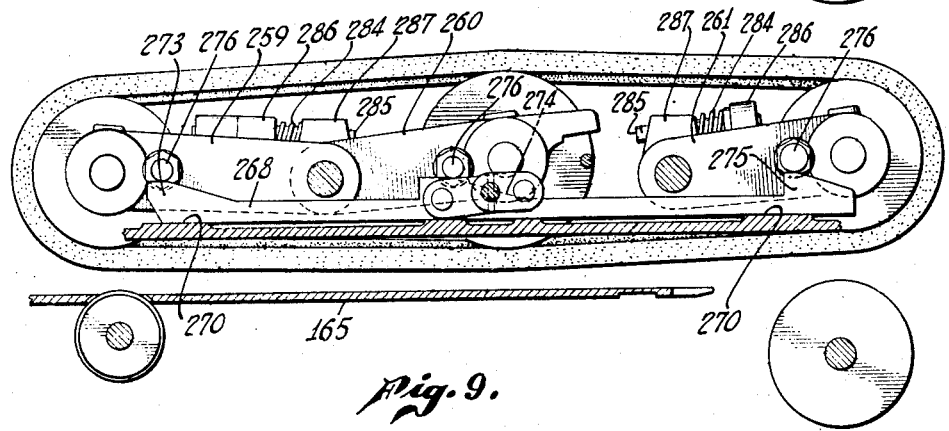
Figure 10:
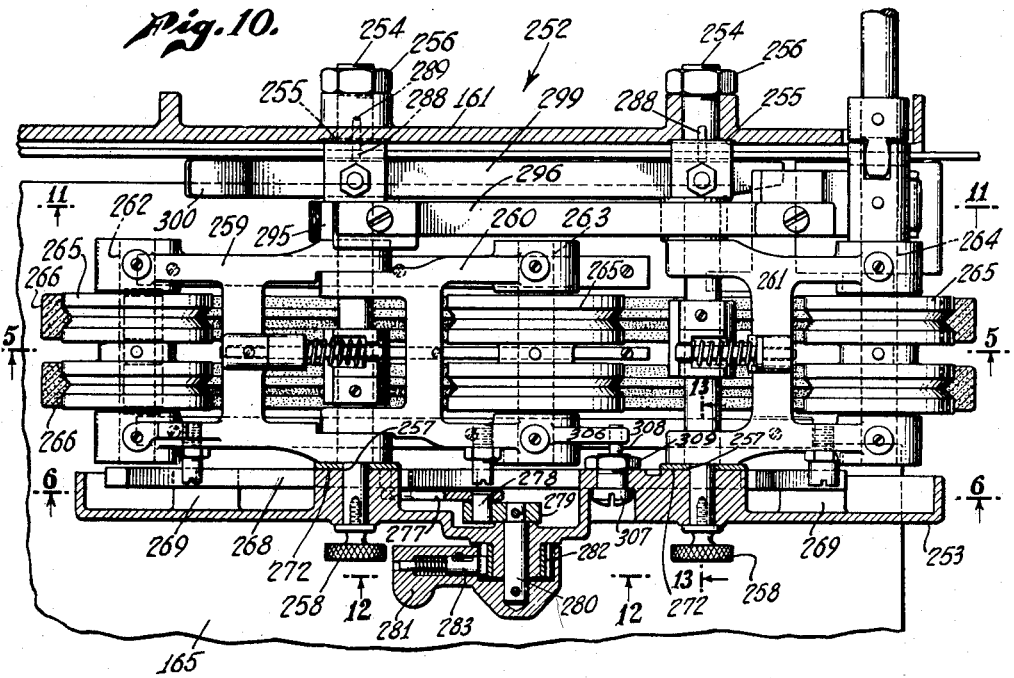
Figure 11:
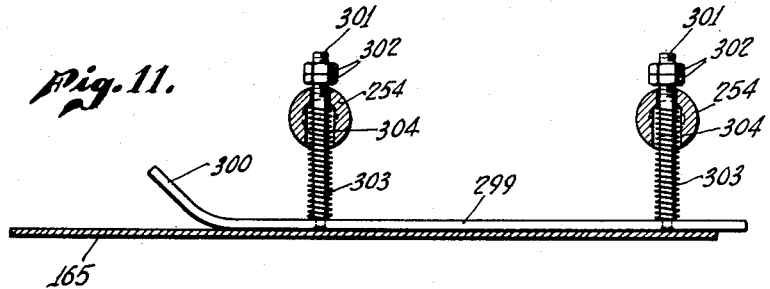
Figure 12:
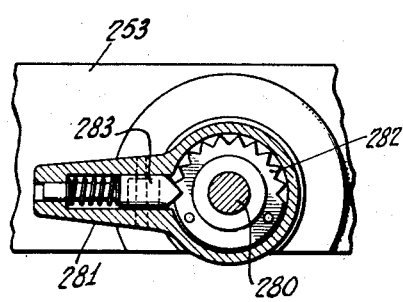
Figure 13:
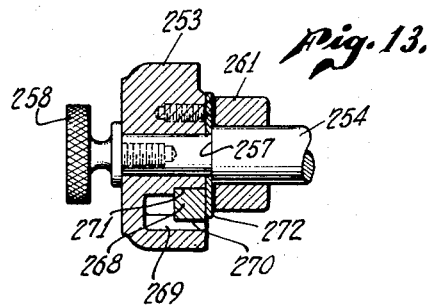
Figure 18:
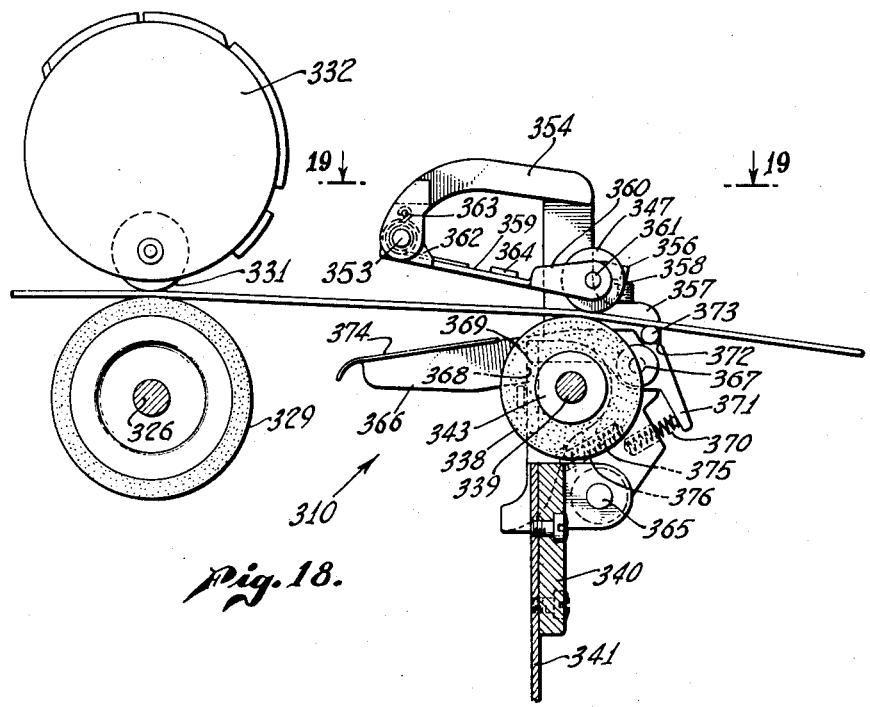
Figure 19:
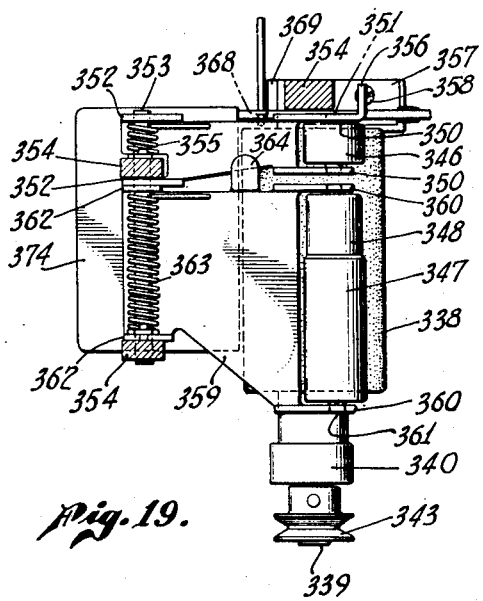

Figures 7, 8, and 9 are sectional views similar to Figure 6 with a portion of the truck supporting frame removed to show the operation of the cam bar and to illustrate the different positions of the hold-down truck frame as the cam bar is moved from left to right;

Figure 10 is a horizontal section showing various details of the hold-down truck;

Figure 11 is a fragmental vertical section of the spring weighted hold-down rail which is associated with the hold-down truck;

Figure 12 is an enlarged fragmental sectional view of the hold-down truck adjusting device taken substantially along the line 12—12 of Figure 10;

Figure 13 is an enlarged fragmental sectional view taken substantially along the line 13—13 of Figure 10;

Figure 14 is a fragmental sectional view taken substantially along the line 14—14 of Figure 2;

Figure 15 is an enlarged fragmental sectional view taken substantially along the line 15—15 of Figure 2;

Figure 16 is a fragmental sectional view showing in enlarged detail certain portions of the mechanism shown in the lower right-hand part of Figure 2;

Figure 17 is an enlarged fragmental sectional view taken generally along the line 17—17 of Figure 1 to illustrate the relation between the final sealing rollers and the printing drum, and illustrating the manner in which the pressure roller is automatically released to swing to its retracted position when the tape feeding device is moved to its operative feeding position;

Figure 18 is a fragmental sectional view similar to Figure 17 but not including the tape feeding device;

Figure 19 is a sectional view taken substantially along the line 19—19 of Figure 18; and, Figure 20 is a fragmental sectional view taken substantially along the line 20—20 of Figure 16 showing the platen roller, its driving shaft, and associated parts.

Similar reference characters refer to similar parts throughout the several views of the drawings.

As shown in Figure 1, the mailing machine is provided with a conveyer table 165 which is spaced a short distance from the intermediate frame plate 161 of the machine in order to provide space for the depending flaps of the envelopes conveyed by the conveying mechanism to be described hereinafter.

As shown in Figure 14, an envelope 166 is shown in position on conveyer plate 165 to be conveyed along the conveyer table. When envelope 166 is unsealed, its flap hangs down over the inner edge of the conveyer plate 165 in the space between the conveyer plate and the intermediate frame plate 161 (Figure 1).

As shown in Figure 1 an envelope feeding hopper 151 is arranged adjacent the left-hand end of conveyer table 165 and beneath the hopper is a metering mechanism generally indicated at 222 (Figure 2) capable of being operated at either one of two different speeds. This metering mechanism delivers the envelopes into the conveying system, and as the conveyer system may be divided into three different units, namely, metering, conveying, and ejecting, the description and construction of the system will follow this same plan of division.

The metering portion 222 of the conveyer system includes a pair of spaced feed belts 221 (Figure 14) which feed belts may be formed of rubber or other suitable material. At one end the two belts are played around a pair of large driving pulleys 224 (Figures 3, 14, and 4), mounted below the envelope hopper and at their opposite ends around a pair of small idler pulleys 225 positioned adjacent the front end of the envelope feed hopper and preferably slightly in advance of the stripper mechanism discs 198.

The driving and idler pulleys are mounted within a suitable frame comprising an inner plate 226 and a main supporting plate 227 (Figures 4 and 14) which plates are inter-connected by tie bolts 228 and support at their forward ends the axle 229 upon which the idler rollers 225 are journaled. The drive shaft 230 (Figure 14) upon which the two large driving pulleys 224 are fastened is journaled in frame bearings 231. The driving shaft 230 extends through the frame supporting plate 227 and carries the driving pulley 232, which pulley in turn, is provided with a lift cam 233 operating in the manner to be described for raising and lowering the metering portion of the conveyer system to feed envelopes from the hopper. In order to provide additional support for the envelope engaging run of the conveyer belts 221, a pair of rollers 234 are journaled upon axle 235 carried by side plates 226 and 227 of the metering device frame.

This metering device frame 236 is mounted for limited vertical movement, by providing two stub shafts 227a extending from the supporting plate 227 and which stub shafts together with axle 229 are pivotally carried by the free end of three supporting levers 237 which levers are in turn pivotally mounted upon studs 238 extending inwardly from the front frame plate 160 of the machine. Through the provision of the three frame supporting levers 237, the metering device frame 236 may be bodily raised to lift the top run of the feed belts 221 into engagement with the under surface of the lowermost envelope in the stack and to thereby apply a sufficient driving force to carry the engaged envelope under the stripper discs 198 while the succeeding envelopes are held back by said stripper discs. This action will deliver the envelope to the second portion of the conveyer system, whereupon the metering device frame will be lowered to in turn lower the feed belts 221 out of engagement with said envelope and will be lifted thereafter to meter out a second envelope in the manner above described. The envelope conveyer plate 165 is provided with two parallel slots 239 (Figure 14) in order to permit the feed belts 221 to be raised into contact with the lowermost of the envelopes placed in the feed hopper.

The mechanism for raising and lowering the metering device may include an elevating cam 233 (Figures 3, 4, and 14) which cam as previously stated, is securely fastened to the driving pulley 232 and during its rotation cooperates with a cam roller 240 which roller is mounted upon the upper end of a suitable post 241 extending upwardly from the main base plate 159 of the machine in the manner shown in Figures 2 and 14. Referring to Figure 3, it may be observed therein that the lift portion of the elevating cam 233 has engaged the cam roller 240 and has thereby caused the metering device to be elevated into its feeding position while in Figure 4, the elevating cam is shown rotated to present its low portion to the cam roller 240 and as a result, the frame will be lowered to the position shown in this figure so that the two feed belts 221 will clear the lowermost envelope placed within the feed hopper. Through the use of the elevating cam 233 and cam roller 240, the metering device is lifted to feed an envelope from the hopper for each revolution of the driving pulley 232.

The metering portion of the conveyer system is provided with an independent driving mechanism whereby it may be driven at relatively high or low speeds when treating long or short envelopes. In Figure 3, the driving means for the metering portion of the conveyer system is shown as it would appear when arranged to drive the metering device at low speed, while in Figure 4, the driving means is shown as it would appear when adjusted for high speed drive. By reference to Figures 2, 3, and 4, it may be observed that the driving mechanism for the metering portion 222 of the conveyer system 153 includes a belt 242 engaging the metering device driving pulley 232 at one end and at its opposite end engaging the larger diameter groove 243 (Figures 4 and 20) of the two-step pulley 244 of the power plant driving mechanism 155 when the metering device is to be driven at high speed. The belt may be shifted to engage the smaller diameter groove 245 when the metering device is to be driven at low speed. In order to maintain at all times the proper tension in the driving belt 242 whether the belt engages the larger or smaller groove in the power plant step pulley 244, a spring weighted take-up pulley device 246 is employed as shown in Figures 2, 3, and 4, and is supported from the front frame plate 160.

The metering device is operated at low speed when feeding standard long envelopes through the machine. The speed of operation of the metering device is timed with respect to other portions of the conveyer system so that a gap of sufficient length is maintained between the envelopes passing through the machine to provide space for the envelope trip fingers to swing into operative position when released from one envelope before being engaged by the following envelope. Through this timing, it is obvious that the leading end of each successive envelope will be spaced a uniform distance apart, therefore, it follows that for shorter envelopes, the gap between the trailing edge of one envelope and the leading edge of the following envelope will be increased in proportion to the decrease in length of said envelopes, consequently when operating on the standard short envelopes, the distance between the envelopes will be greater than necessary for the return of the tripping device, therefore, it is desirable to speed up the metering device with relation to the other portion of the conveyer system so that the gap between said envelopes is reduced, thus permitting a greater number of envelopes to be fed through the machine for a given period of time.

When envelopes are to be sealed without printing postage values thereon, the metering device 222 of the envelope feed conveyer system may be maintained in its elevated position as shown in Figure 3 to continuously feed the envelopes from the feed hopper thereby greatly increasing the speed of operation of the machine.

To maintain the metering device 222 in its elevated position for the purpose of sealing, cam 236a is carried by the inner end of an actuating shaft 236b journaled adjacent its cam end in the cam roller post 241 and extending through the front frame plate 160 (Figure 1) to carry a control handle 236c. The elevating cam 236a is of the shape best shown in Figures 2, 3, and 4, and when in its retracted position engages a stop pin 236d which extends from post 241 and while in this position its cam surfaces is clear of the supporting frame 227 of the metering device 222. When the elevating cam 236a is turned by means of its control handle 236c to its broken line position as shown in Figure 3, the lift portion of this cam will engage the bottom edge of the metering device supporting plate 227 and will lift and maintain said device in its elevated position as shown in Figure 3, thereby maintaining the feed belts 221 in continuous contact with the lowermost envelopes stacked in the hopper and thereby feeding them out in rap'd succession without space between.

As illustrated in Figure 3, when the elevating cam 236a has been rotated to its elevating position as shown in broken lines in this figure, one of the shoulders formed in the cam will engage the stop pin 236d to thereby maintain the cam in its adjusted position.

The top run of the driving belt 242 is depressed by means of idler pulleys 247 and 248 to clear the envelope flap moistening device 154 as is clearly shown in Figures 3 and 4. The idler pulley 247 is journaled upon one of the stub shafts 238, while the idler pulley 248 is journaled upon the sealer roller shaft 249 (Figures 3 and 4) which shaft is journaled in the intermediate frame side plate 161 and bracket 250, which extends upwardly from base 159 of the main frame.

The second portion of the conveyer mechanism includes the conveying means for receiving the envelopes from the metering device 222 and conveying the envelopes through the flap moistening device 154 (Figure 3) and delivering the envelopes to the printing drum of the meter. This portion of the conveyer system includes a hold-down truck mechanism generally referred to by the reference number 252 (Figures 1, 2, 5, 6, 7, 8, 9, 10, 12, and 13). The hold-down truck 252 includes a frame member 253 (Figure 10) supported from the intermediate frame side plate 161 by a pair of specially formed studs 254. These studs extend through said side plate and are shouldered as at 255 to engage the front face of said plate and are securely fastened thereto by means of nuts 256. The outer end of each of these studs is of reduced diameter to provide a shoulder 257 against which the truck frame 253 is securely clamped by means of knurled thumb screws 258. In this manner the truck frame 253 is rigidly mounted above the conveyer table plate 165 and provides the necessary clearance for the thickest piece of mail matter which can be treated in the machine.

The hold-down truck includes a leading swing frame 259, an intermediate swing frame 260 and a trailing swing frame 261. The leading and intermediate swing frames are pivoted on one of the two supporting studs 254, while the trailing swing frame is pivoted on the other of said studs in the manner as clearly shown in Figure 10. Each of these swing frames may be generally in the form of an H and the free ends of each are provided with a suitable shaft, as for example, the leading truck is provided with shaft 262, the intermediate swing frame with shaft 263 and the trailing swing frame with the driving shaft 264. Pinned to rotate with each of the above-mentioned shafts between the open ends of the H shaped frames is a pair of spaced conveyer belt pulleys 265 which are preferably formed as an integral unit. The above-mentioned pulleys carry two conveyer belts 266 which conveyer belts are preferably formed of rubber.

The conveyer belts 266 are spaced to straddle the three conveyer plate guide rails 267 (Figure 15), which rails are provided to reduce the friction between the envelope and conveyer plate 165 and to also assist in maintaining the envelope in true transverse alignment during its travel from the metering device to the printing head.

A control means is provided for elevating the conveyer belts when operating upon mail matter of various degrees of thickness and which control mechanism may regulate the height of the conveyer belt above the envelope conveyer plate 165 to best suit the thickness of mail matter being treated. The control means includes a cam rail 268 (Figures 7, 8, 9, and 10) slidably mounted in the hold-down truck frame 253 by providing this frame with a number of shouldered pads 269 having guide surfaces 270, hold-down guide surfaces 271 (Figure 6) and maintaining said cam rail in operative position by means of retaining plates 272 (Figures 6 and 10). The cam rail is provided with a cam surface 273 for the leading swing frame, cam surface 274 for the intermediate swing frame and cam surface 275 for the trailing swing frame. Each of the swing frames is provided with transversely extending pins 276 arranged to cooperate with their respective cam surfaces.

In order to actuate the cam rail 268, it is connected by means of link 277 to crank pin 278 of crank arm 279 (Figure 10) which in turn is securely fastened to the inner end of the adjusting shaft 280 which shaft is journaled in the hold-down truck frame 253 and has fastened upon its forward end an adjusting handle 281. The hold-down frame bearing boss through which the adjusting shaft 280 extends is turned to receive a ratchet disc 282, while the handle 281 is provided with a spring weighted pawl 283 for releasably engaging the notches of the ratchet disc to maintain the slide bar in any one of its adjusted positions.

As shown in Figures 1 and 12, when control handle 281 is set in the first of the ratchet plate notches, the conveyer belts will be positioned as shown in Figure 6 for the handling of the thinnest mail. As the handle is swung from this position clockwise, the conveyer belts are elevated to permit the conveyer to handle thicker mail. To adjust the hold-down truck 252 for square flaps and for mail of various thickness, the control handle 281 will be rotated in a clockwise direction as viewed in Figures 1, 10, and 12, which rotation through the mechanism previously described will move the cam rail from left to right.

During the initial movement of the cam rail, its trailing cam surface 275 will engage the trailing swing truck cam pin 276 and lift this swing frame to a position shown in Figure 7. If the adjustment is stopped at this point, the machine will be adjusted to handle thin square flapped envelopes. However, if thicker envelopes are to be treated, the rotation of the control handle 281 will be continued in the same direction causing the cam rail to continue its movement from left to right and as a result, the trailing swing frame will be raised to a higher level and at the same time the leading cam surface 273 will engage cam pin 276 of the leading swing frame thereby lifting said leading swing frame as shown in Figure 8. This position of the control lever will enable the machine to treat mail matter of medium thickness. For the treating of mail matter of maximum thickness, the control handle will be swung until its pawl 283 engages the last notch in the ratchet plate 282 shifting cam 268 to the position shown in Figure 9 in which position the leading and trailing swing frames have been elevated to their maximum position while the intermediate swing frame will have raised, but not to such a high point as the other two swing frames.

The leading and the trailing swing frames are urged downwardly by means of compression springs 284 which are confined on studs 285 having shoulders 286. The studs 285 are mounted on the swing frames 259 and 261 as clearly shown in Figure 5. The compression springs are interposed between the shoulders 286 on the studs 285 and brackets 287 secured to the mounting studs 254. In order to prevent the supporting studs 254 from rotating under the influence of compression springs 284, key pins 288 are mounted to extend from the shoulders 255 of said studs into registering holes 289 formed in the main frame intermediate plate 161 (Figures 10 and 15). The intermediate swing frame pulleys 265 rely upon gravity and tension of the conveyer belts 266 for maintaining the necessary pressure upon the mail matter as it travels under this portion of the hold-down truck.

Figure 5:
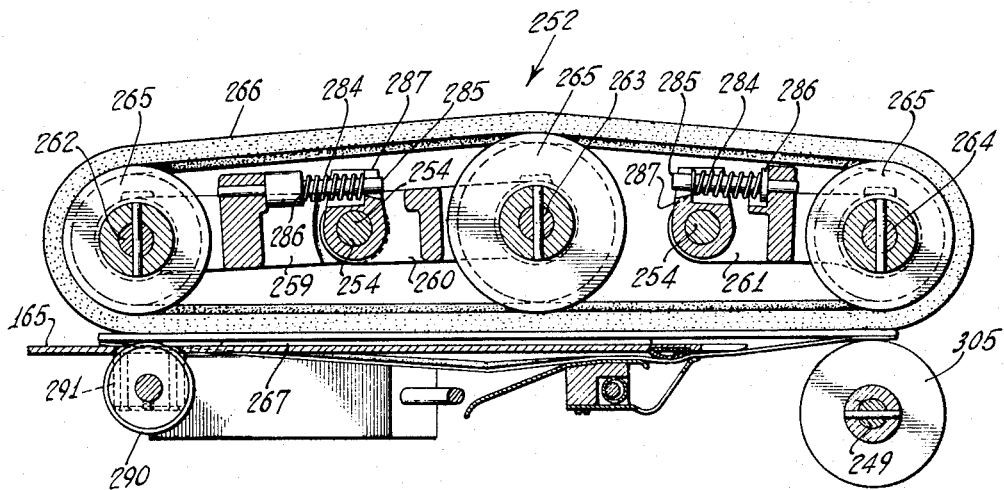
Figure 5 is an enlarged sectional elevation of the hold-down truck which holds the envelopes on and drives them along the conveyer table, this view being taken substantially along the line 5—5 of Figure 10.

To facilitate passage of the mail into and through the hold-down truck portion of the conveyer system, the peripheral surface of roller 290 extends upwardly through a suitable opening formed in the conveyer plate table 165 and is journaled in bearings 291 upon the underside of said plate in the manner shown in Figures 2, 5, and 6, and is preferably located adjacent the leading end of the hold-down truck conveyer 252. This roller also assists in elevating the leading edge of the mail matter up onto the guide rails 267.

The hold-down truck assembly 252 is provided with a creasing roller 293 (Figures 3, 4, and 15) which cooperates with a portion of the main sealing roller 305 to crease the flap edge of the envelopes as they leave the moistening device 154. This roller is journaled in a bracket 294 in turn connected to a supporting bracket 295 by means of leaf spring 296. The supporting bracket 295 is securely fastened upon the leading truck frame supporting stud 254. As shown most clearly in Figures 3 and 4 an eccentric 297 is mounted upon the trailing truck supporting stud 254 and is operable for adjusting the normal position of the sealing roller 293. Eccentric 297 is adjustably secured upon stud 254 by means of a set screw 298. Guide means are provided for directing the flaps of the envelopes to the moistening device 154 (Figure 2). This means may include a wedge-shaped block 423 fastened to the intermediate frame plate 161 clamping between said block and said plate the letter guide plate 170. The wedge block 423 acts to start the folding movement of the downwardly hanging flaps of those envelopes to be sealed, and to further assist the block in its folding action especially when treating envelopes having deep flaps, a pin 425 extends from block 423 at an angle directed toward the moistening device 154. A guide plate 426 receives the envelope flaps as they ride over wedge-shaped block 423 and pin 425 and acts to direct the flaps of the envelopes under the moistening device 154.

In order to hold the flap edge of the envelope in proper relation with respect to the top surface of the envelope conveyer plate 165, a spring weighted guide rail 299 (Figures 10, 11, and 15) is mounted directly over the inner edge of said plate 165 and overhangs the space between the envelope supporting plate 165 and the envelope guide plate 170. The spring weighted guide plate 299 is curved upwardly at its leading end as at 300 (Figure 11) in order to facilitate the entrance of mail matter thereunder. Extending upwardly from the guide plate 299 are supporting screws 301 which pass through suitable bores formed in the conveyer truck supporting studs 254 and each is provided at its upper end with a pair of adjusting nuts 302. Acting between the supporting studs 254 and the top surface of the guide rail 299 are compression springs 303. The supporting studs 254 may be counterbored as at 304 to receive the upper ends of springs 303 in the manner shown in Figure 11.

The forward and trailing ends of the hold-down truck conveyer belts 266 (Figures 3 and 4) engage and are supported above the upper surface of the envelope conveyer plate 165 by rollers 290 and 305 and in order to maintain the center portion of the conveyer belts 266 in clearance relation with respect to the envelope conveyer plate 165 as shown in Figure 6, the intermediate swing frame 260 is provided with a finger 306 and the truck frame 253 with a bolt 307 having an eccentric pin 308 arranged to engage the intermediate swing frame finger when the latter is in its lower-most position as shown in the above-mentioned figure. The bolt is provided with a lock nut 309 (Figure 10) for adjustably locking said bolt in its adjusted position.

A further feature of this portion of the envelope conveyer system 153 resides in mounting or positioning the sealing roller 305 (Figure 3) directly below the trailing end of the hold-down truck mechanism 252. This arrangement serves two important functions, the first of which is to assist in the advancing of the envelopes to the printing drum and secondly to assist in folding and sealing the moistened flaps up against the body portions of the envelopes.

The final ejecting portion of the envelope conveyer system 153 receives the envelopes from the hold-down truck mechanism 252 and operates to convey the envelopes past the printing drum and finally to eject the treated envelope from the machine. This portion of the envelope conveyer system, which we have referred to as the final ejecting portion of the conveying system comprises a platen roller mechanism generally indicated at 309 (Figure 4) and a final sealing and ejecting roller device generally indicated at 310.

The platen roller mechanism 309 is arranged to automatically maintain the proper pressure against the printing drum of meter 157 for treating the full range of envelope thicknesses permissible by the capacity of the machine. The platen roller mechanism 309 includes a swing frame 311 comprising a front plate 312 and a rear plate 313 (Figure 20) maintained in spaced relation by suitable spacer bolts 314 and 315 (Figures 3, 4, and 16) and the two plates forming the swing frame are pivotally mounted upon pivot shaft 316 and said swing frame is yieldingly maintained in its normal position of rest by compression spring 317 acting between a pair of lock nuts 318 carried by push rod 319 and pivot block 320 pivotally supported between the front frame plate 160 of the machine and bracket 321 (Figures 3 and 4). The upper end of push rod 319 is pivotally connected to the spacer bolt 315 as may be observed in Figures 3 and 4 while its lower end is provided with a pair of adjusting nuts 322. A resilient washer 323 is mounted on rod 319 between the adjusting nuts and pivot block to cushion the engagements of said adjusting nut against said block when the swing frame 311 is returned to its raised position.

Referring more particularly to Figure 20, the swing frame is provided with bearings 324 and 325 in which the platen drive shaft 326 is journaled. The platen roller 327 is keyed upon the inner end of shaft 326 by means of a suitable tapered pin 328. An ejector roller 329 is positioned between the front and rear swing frame plates 312 and 313 and is mounted on and keyed to shaft 326 by taper pin 330. The platen and ejector rollers may be rubber tired as shown in the drawings.

When the machine is set for sealing envelopes without printing postage thereon, the ejector roller 329 cooperates with a small idler roller 331 (Figure 18), journaled in the printing drum 332 of the meter to convey the envelope past the printing station and to present the envelope to the final sealing and ejecting rollers 310. This same action is attained upon completion of the printing operation.

The swing frame 311 is provided with a power driven rubber tired conveyer roller 333 and driven from the platen shaft 326 through a suitable train of gears 334 (Figures 16 and 20). An idler roller 335 mounted in the printing drum housing (Figure 2) cooperates with the roller 333 of the swing frame to assist in conveying the mail matter to and through the printing station. Envelope supporting plate 336 (Figures 1, 2, and 16) is connected to swing frame front plate 212 by hinge means 337 (Figure 16) which operate to normally maintain plate 336 in a horizontal plane and permit the plate to be swung upwardly to facilitate shifting of the metering device driving belt 242.

The final sealing and ejecting device 310 may include a driven rubber tired roller 338 carried by shaft 339 journaled in bracket 340 (Figures 1 and 18) which bracket is suitably fastened to the left side cover plate 341. A driving connection is formed between the platen driving shaft 326 and roller shaft 339 which driving connection may include providing the step pulley 244 with a belt groove 342 (Figure 20) and a driven pulley 343 (Figures 3 and 4) fastened to shaft 339 and connecting these two pulleys by means of belt 344. As may be observed in Figure 2, a belt tightening roller 345 is mounted upon the underside of the envelope supporting plate 336 and acts to maintain a sufficient tension in the driving belt 344.

Cooperating with roller 338 are two spring weighted pressure rollers, the first of which may be referred to as the creasing roller 346 (Figure 19) and is relatively narrow in width to engage only the flap edge of the envelope to complete the creasing and also assist in the sealing of the flap. The second pressure roller 347 is of greater width and acts to firmly press the moistened flap against the body of the envelope to effect the final sealing thereof. This roller organization also operates to eject the treated mail matter from the machine.

To prevent pressure roller 347 from contacting the newly printed stamp on the envelope, and thereby smearing the impression, the portion 348 (Figure 19) of the roller is of sufficiently reduced diameter to clear said newly printed stamp.

The creasing roller 346 is swingably mounted with relation to the main sealing roller 338 to provide for different thicknesses of mail matter passing between these two rollers. The means for mounting the creasing roller may include a hinge plate 349 bifurcated at its free end and the bifurcated portions are bent to form vertical bearing flanges 350. An axle 351 carried by bearing flanges 350 supports the creasing roller 346. The opposite end of swing plate 349 is bent to form a pair of spaced vertical flanges 352 for hingedly mounting this end of the plate to hinge pin 353 which pin is supported in bracket 354 (Figures 18 and 19). A torsion spring 355 encircles hinge pin 353 and acts between the hinge plate and bracket to yieldingly urge the creasing roller 346 against the sealing roller 338. The inner-most of the two bearing flanges 350 is flanged rearwardly to provide a stop lug 356 which lug overhangs an offset portion 357 of bracket 354. Screw threaded into this portion of the bracket is an adjusting screw 358 against which the stop lug 356 engages to hold said creasing roller in proper clearance relation with respect to said sealing roller. This clearance is just sufficient to hold the creasing roller out of driving engagement with the sealing roller so as not to unduly wear or deform the rubber surface of said sealing roller.

A similar type of hinge plate 359 is provided for swingably supporting roller 347 from bracket 354 and said bracket is provided at its free end with spaced bearing flanges 360 for pivotally supporting roller shaft 361 while the other end of the hinge plate is provided with flanged brackets 362 for pivotally mounting the plate to hinge pin 353 in the manner shown in Figures 18 and 19. A torsion spring 363 surrounds hinge pin 353 between the hinge plate flanges 262 and acts between the plate and bracket 354 to yieldingly urge roller 343 toward the main sealing roller 338. Roller 347 is maintained in the same clearance relation with respect to the main sealing roller 338 as described for the creasing roller 346 by providing the hinge plate 359 with an offset lug 364 overlying so as to rest upon the upper surface of the creasing roller hinge plate 349. The offset lug 364 of swing plate 359 does not prevent roller 347 from being lifted due to irregularities of the mail matter independently of the creasing roller 346.

When the machine is adjusted to print postage indicia upon gummed tape, it is desirable to automatically retract the creasing and pressure rollers 346 and 347 to a position as shown by broken lines in Figure 17 and for this purpose bracket 354 is hinged to the supporting bracket 340 by pin 365. A latch member 366 pivotally mounted upon bracket 354 by hinge pin 367 is provided with a latch notch 368 (Figures 17 and 18) engaging a latch plate 369 securely fastened upon the inner face of the main supporting bracket 340. In order to yieldingly maintain the latch member in latching relation with plate 369 a compression spring 370 is interposed between the latch finger 371 and a suitable bore formed in the main supporting bracket 340. The latch member is notched as shown at 372 in Figure 17 and a stop pin 373 carried by bracket 354 cooperates with notch 372 to limit the swinging motion in either direction of latch member 366. The latch member 366 is utilized to support a guide plate 374 which operates to guide the envelopes or other mail matter from the platen and ejector rollers to the final sealing roller assembly. The guide plate 374 is preferably formed as shown in Figures 17, 18, and 19. A retracting spring 375 is mounted within a hole 376 drilled into bracket member 354 (Figures 17 and 18). The end of spring 375 which engages the inner end of bore 376 is enlarged to frictionally bind the spring within said bore while the free end of the spring extends a short distance beyond bracket 354 to engage the main supporting bracket 340 when bracket 354 is in its latched position and acts upon release of latch member 366 to supply the force necessary to swing bracket member 354 to its retracted position as shown in broken lines in Figure 17. In this figure the free end of the retracting spring 375 may be seen projecting from bracket member 354 when swung to its retracted position.

The creasing pressure rollers 346 and 347 (Figure 19) are manually returned to their normal operative position, but may be tripped automatically to swing to their retracted position upon removal of the meter or when shifting the tape feeding device from its non-printing to its printing position in a manner (later to be) described in the above-noted application of Frank P. Sager et al.

When the final sealing and ejecting device 310 (Figure 1) is in its normal operating position and the machine is set for treating mail matter, a receiving hopper 377 may be attached to end plate 341 of the machine to receive the envelopes or other mail matter as they are ejected from the final sealing and ejector rollers 310. To support the receiving hopper 377 from end plate 341, groove studs 378 are provided (Figures 1 and 2), for receiving the bifurcated flanged brackets 379 formed on the end of the receiving hopper. The receiving hopper may be of any suitable construction, but as shown in Figure 1 of the drawings may include a body portion consisting of a base 380 together with an integrally associated back plate 381. It may also be provided with an end plate 382 mounted upon slide bar 383 which bar is slidably mounted upon the undersurface of the base portion 380 in any suitable manner not shown. The slide bar 383 may be provided with a knob 384 to provide a convenient handle for adjusting the end plate with relation to the hopper. It is desirable to provide the hopper with a false bottom 385 so shaped as to cause the envelopes to stack against the back and end plates thereof. The false bottom may be attached to the end plate in any suitable manner. Preferably there is provided a wedge-shaped block 385a which is secured to false bottom 385 and which elevates the stack of mail from the false bottom to facilitate entry of the fingers under the mail when it is ready to be removed from the hopper. As shown in Figure 1, the receiving hopper is provided with lug 386 engaging end plate 341 to provide a third point of support from said plate and thereby stabilizing the hopper.

The conveyer system just described constitutes one of the important features of this invention and operates to efficiently meter, convey and eject envelopes through the treating elements of the machine and is provided with suitable adjustments to enable this system to effectively handle envelopes of various lengths, widths, and thicknesses. In operating the system it is recommended that the mail matter be segregated for value of postage to be printed thereon, for length, width and thickness. With the selection of one of the segregated groups for treatment, the meter will be adjusted to print the selected value of stamp thereon and the envelope feed hopper adjusted to suit the length and width of envelope, the stripper and hold-down truck mechanisms adjusted to suit the thickness of said envelopes and thereafter the machine may be placed in operation and the envelopes stacked in the feed hopper from which they will be automatically withdrawn and passed through the treating mechanism in the manner described. During the passage of envelopes through the machine, the flaps may be moistened for sealing or left unsealed at the option of the operator.

It does not require special adjustment of the machine to provide for the moistening of the envelope flaps, whether the flaps are of standard or special shape, deep or shallow, long or short. For those envelopes which are to have their flaps moistened for sealing the operator need only stack such envelopes in the feed hopper with their flaps nested and hanging down over the envelope supporting plate 165. If the envelopes are not to be sealed, the operator should place the same in the hopper with their flaps folded against the body portion thereof. The envelopes which are to be sealed and those which are not to be sealed may be stacked indiscriminately within the feed hoper in the m nner above described and the flaps of those envelopes which are to be sealed will be automatically moistened while the flaps of the other envelopes will pass free of the moistening device.

From the above it may be seen that I have provided a conveying mechanism which is capable of obtaining the objects set forth hereinabove in an efficient manner.

As many possible embodiments may be made of the above invention, and as many changes might be made in the embodiment above set forth, it is to be understood that all matter hereinbefore set forth, or shown in the accompanying drawings, is to be interpreted as illustrative and not in a limiting sense.

I claim:

1. In a conveyer system operable for serially presenting objects to the treating element of an object treating machine, a hold-down truck mechanism, including three aligned hold-down trucks mounted for movement relative to the machine frame, hold-down conveyer belt means trained over all of said trucks and a single adjusting means operable for progressively adjusting the object engaging relation of said hold-down trucks.

2. In a conveyer system operable for serially presenting objects to the treating element of an object treating machine, a hold-down truck mechanism, including three aligned hold-down trucks mounted for movement relative to the machine frame, hold-down conveyer belt means trained over all of said trucks and a single adjusting means operable for progressively adjusting said hold-down trucks in the following order: rear truck, front truck, and center truck.

3. In a conveyer system arranged to convey envelopes with their flaps open the combination of, a supporting surface along which the envelopes are advanced with their flaps overhanging one edge thereof, a guide surface positioned a predetermined distance from said supporting surface edge to provide a narrow passageway for the envelope flaps, a hold-down conveyer mounted in opposed relation to said supporting surface, and a spring weighted surface positioned between said hold-down conveyer and guide surface to overlie said narrow passageway and a portion of said supporting surface for holding down the body portions of the envelopes adjacent the flaps as they are conveyed thereunder.

4. In a conveyer system for advancing envelopes through an envelope stamping and sealing machine, in combination, an elongated horizontal supporting table along which the envelopes are adapted to be conveyed with their flaps overhanging one edge thereof, a vertical guiding surface positioned a predetermined distance from said one edge of the supporting table to provide a narrow space for the passage of the envelope flaps, a spring weighted surface overlying said narrow space and also a portion of said table for preventing displacement of the body portion of the envelope adjacent the flap from its proper path of travel, and a hold-down mechanism mounted on said machine adjacent said vertical guiding surface and over said horizontal supporting table and movable up and down relative to said table as envelopes are conveyed thereover to engage the upper surfaces of envelopes and convey them along said table.

5. In a conveyer system for advancing envelopes through an envelope stamping and sealing machine, in combination, a supporting table along which the envelopes are adapted to be conveyed, a hold-down mechanism having a hold-down truck at each end thereof, a roller rotatably mounted on said table and extending therethrough and underlying one of said trucks, a roller rotatably mounted in said machine and underlying the other of said trucks, spring means for biasing said last-mentioned truck toward said last-mentioned roller, a hold-down belt trained over said trucks and directly engaging and supported by said rollers in spaced relation from the surface of said table whereby the belt is held from frictionally engaging the table, said belt being adapted to engage and convey envelopes along said table, and driving means including a universal joint connected to said last-mentioned hold-down truck for positively driving said truck, said belt and said first-mentioned truck.

6. In a conveyer system for advancing envelopes at a high rate of speed through an envelope stamping and sealing machine, in combination, a supporting table along which the envelopes are adapted to be conveyed and on which the envelopes are supported as they are conveyed, an envelope hold-down mechanism having a hold-down truck at each end thereof, a rotatable member rotatably mounted on said table and extending therethrough and underlying one of said trucks, a rotatable member rotatably mounted in said machine and underlying the other of said trucks, spring means for biasing said last-mentioned truck toward said last-mentioned rotatable member, a hold-down belt trained over said trucks and supported by said rotatable members in spaced relation from the surface of said table, said belt being adapted to engage and convey envelopes along said table, driving means connected to one of said hold-down trucks for driving said truck and accordingly said belt and the other of said trucks, and an elongated spring-weighted member mounted on said machine and movable relative to said table and adapted to engage one edge portion of the envelopes as they are conveyed over said table to hold said envelopes to their proper path of travel.

7. In a conveyer system for advancing envelopes at a high rate of speed through an envelope stamping and sealing machine, in combination, a supporting table along which the envelopes are adapted to be conveyed with their flaps overhanging one edge thereof, a vertical guiding surface positioned a predetermined distance from said one edge of the supporting table to provide a narrow space of uniform width for the passage of the envelope flaps, a guide rail overlying at least a portion of said narrow space for guiding the flap edge of the envelope, means securing said guide rail to said vertical guiding surface for vertical movement relative to said table, spring means for biasing said guide rail toward said table, a hold-down conveyer mechanism adjacent said guide rail and over said supporting table, and means securing said hold-down mechanism to said vertical guiding surface for movement up and down relative to said table, whereby said hold-down mechanism may engage the upper surfaces of envelopes and convey them along said table.

8. In a conveyer system for advancing envelopes at a high rate of speed through an envelope stamping and sealing machine, in combination, a supporting table along which the envelopes are adapted to be conveyed with their flaps overhanging one edge thereof, a vertical guiding surface positioned a predetermined distance from said one edge of the supporting table to provide a narrow space of uniform width for the passage of the envelope flaps, a guide rail overlying at least a portion of said narrow space for guiding the flap edge of the envelope, means securing said guide rail to said vertical guiding surface for vertical movement relative to said table, spring means for biasing said guide rail toward said table, a hold-down conveyer mechanism adjacent said guide rail and over said supporting table, means securing said hold-down mechanism to said vertical guiding surface for movement up and down relative to said table, whereby said hold-down mechanism may engage the upper surfaces of envelopes and convey them along said table, and means forming a driving connection for said hold-down conveyer mechanism to positively drive said mechanism.

9. In a conveyer system for advancing envelopes at a high rate of speed through an envelope stamping and sealing machine, in combination, a supporting table along which the envelopes are adapted to be conveyed and against which the envelopes slide as they are moved along, a vertical guiding surface positioned a predetermined distance from one edge of said supporting table to provide a narrow space of uniform width to accommodate the envelope flaps when the envelopes are conveyed along the table with their flaps overhanging said one edge thereof, a pair of supports secured to and extending horizontally from said vertical surface, an elongated guide rail movably secured to said supports so as to be capable of up and down movement relative to said supporting table, the ends of said guide rail being individually movable and said guide rail overlying said narrow space and also a portion of said table for guiding the flap edge of the envelopes, spring means for biasing said guide rail downwardly toward said table, a hold-down mechanism including a hold-down truck at each end thereof, a rotatable member rotatably mounted on said table and extending therethrough and underlying one of said trucks, a rotatable member rotatably mounted in said machine and underlying the other of said trucks, spring means for biasing one of said trucks toward its underlying rotatable member, a hold-down belt trained over said trucks and supported by said rotatable members in spaced relation from the surface of said table, said guide rail lying between said vertical surface and said hold-down mechanism, said belt being adapted to engage and convey envelopes along said table, and driving means connected to one of said hold-down trucks for driving said truck and accordingly said belt and said first-mentioned truck.

10. In a conveyer system for advancing envelopes at a high rate of speed through an envelope treating machine wherein the envelope is fed with the flap extended and the flap is guided through a flap turning device to be positioned flat against the envelope, that improvement which consists in providing a conveyer for frictionally engaging the address side only of the envelope and for moving the envelope along a plane, and means for yieldingly urging the body portion of the envelope adjacent the flap toward said plane in opposition to the action of the flap turning device which tends to force said body portion of the envelope away from said plane.

11. In a conveyer system for advancing envelopes at a high rate of speed through an envelope treating machine including a flap turning structure, the combination of a support table along which the envelopes are adapted to be moved with their flaps overhanging one edge thereof in a position where said flaps may be engaged by said flap turning structure which turns the flap of each envelope toward the underside of the envelope, the engagement between said flap turning structure and said flaps tending to force the body portion of each envelope adjacent the flap thereof away from the plane of said support table, an envelope guiding surface disposed at an angle to said support table and spaced therefrom to provide a slot through which the envelope flap extends as it moves along said support table, means for yieldingly engaging said body portion of the envelope as it is moved along said support table to counteract the tendency of said flap turning structure to displace said body portion of the envelope from the plane of said support table, and conveyer means for frictionally engaging the upper side of the envelope to move it along said support table.

12. Apparatus as described in claim 11 wherein the conveyer means includes a rotatable member, and means for positively driving said rotatable member.

13. In a conveyer system for advancing envelopes at a high rate of speed through an envelope treating machine, wherein the envelope is fed with the flap extended and the flap is guided through a flap turning device to be positioned flat against the envelope, the combination of a stationary frame construction having a longitudinal table along which the envelopes are moved with the reverse side of the envelopes facing the table surface and with the envelope flaps overhanging the edge of the table, guide means spaced from said edge of said table and adapted to hold the envelopes against edgewise displacement, conveying means positioned to frictionally engage the address side only of the envelopes and to move the envelopes along the table, a longitudinal bar having a surface substantially parallel to the surface of said table and extending over said edge of said table and thence along the space between said table edge and said guide means, said longitudinal bar means being yieldingly urged toward the plane of said table surface thereby to oppose the tendency of the body portions of the envelopes adjacent the flaps thereof to move away from the plane of the table surface by the action of the flap turning means, and mounting means for said longitudinal bar providing a floating support to permit the bar to assume a position out of parallelism with respect to the plane of said table surface.

14. Apparatus according to claim 13, wherein the conveyer means comprises an endless belt mounted longitudinally of said table with one of its runs moving along said table surface parallel thereto and spaced therefrom, and truck means at the opposite ends of said run yieldably and independently urged toward the plane of said table surface, said endless belt being trained about said truck means.

15. Apparatus according to claim 13, wherein the conveyer means comprises an endless belt mounted longitudinally of said table with one of its runs moving along said table parallel thereto and spaced therefrom, and roller means rotatably mounted on stationary axes parallel to the surface of said table for urging said run away from said table surface.

COMMODORE D. RYAN.